(12) United States Patent
Murray et al.

(10) Patent No.: US 6,257,013 B1
(45) Date of Patent: Jul. 10, 2001

(54) AIR CONDITIONING SYSTEM MOUNTING

(76) Inventors: William C. Murray, 3323 McKinley Rd.; Cleates F. Murray, 3308 W. Walnut St., both of Johnson City, TN (US) 37604

( * ) Notice: Subject to any disclaimer, the term of this patent is extended or adjusted under 35 U.S.C. 154(b) by 0 days.

(21) Appl. No.: 09/373,086

(22) Filed: Aug. 12, 1999

(51) Int. Cl.[7] ................................................. F25D 23/00
(52) U.S. Cl. ................................................................ 62/302
(58) Field of Search ................................................. 62/302

(56) References Cited

U.S. PATENT DOCUMENTS

| | | | | |
|---|---|---|---|---|
| 2,497,785 | * | 2/1950 | Melcher ................................. | 104/89 |
| 2,948,498 | * | 8/1960 | Johnsen et al. ........................ | 248/17 |
| 3,178,902 | * | 4/1965 | Costantini et al. .................... | 62/302 |
| 3,210,957 | * | 10/1965 | Rutishauser et al. .................. | 62/302 |
| 3,230,733 | * | 1/1966 | Rutishauser et al. .................. | 62/302 |
| 3,323,625 | * | 6/1967 | Webster ................................. | 62/302 |
| 3,772,898 | * | 11/1973 | Anderson .............................. | 62/302 |
| 3,831,395 | * | 8/1974 | Levy ...................................... | 62/263 |
| 4,019,339 | * | 4/1977 | Anderson .............................. | 62/255 |
| 4,539,737 | * | 9/1985 | Kerpers et al. ........................ | 29/423 |
| 5,031,414 | * | 7/1991 | Walter et al. .......................... | 62/298 |

* cited by examiner

*Primary Examiner*—William Doerrler
*Assistant Examiner*—Mark S. Shulman (57) ABSTRACT

A device for facilitating the servicing of A.C. units which are mounted underneath the floor of manufactured homes, recreational vehicles or the like near an access location such as the rear of the vehicle which device is provided with a movable carriage for supporting substantially the entire A.C. unit and which is constructed to be easily slid out from underneath the vehicle at the access location whereby the unit is in an exposed position for easy servicing.

20 Claims, 7 Drawing Sheets

AIR CONDITIONING SYSTEM MOUNTING

BACKGROUND OF THE INVENTION

1. Field

This invention concerns a unique support device for air conditioning units including heat pumps which are normally positioned underneath building structure, whereby, by means of the present invention the entire unit or the major components thereof are easily movable by means of the device between a relatively inaccessible installed position and a readily accessible servicing position. The present device is particularly useful for mounting air conditionding units on the underside of mobile or manufactured homes, recreational vehicles or the like to the support beams or other support means thereof.

2. Prior Art

Heretofore, with reference to U.S. Pat. 3,962,885, the disclosure of which is hereby incorporated herein by reference in its entirety, structure has been proposed for simplifying the installation of an A.C. unit underneath a side of a trailered home, however, no such device as herein presented has been suggested to easily and quickly move the unit substantially completely outside of the home for servicing and then to move it back easily and quickly underneath the home to its installed position.

Objects therefore, of the present invention are: to provide an easily serviceable air conditioning system for stationary buildings or homes such as mobile homes, recreational vehicles or the like, all hereinafter referred to as vehicles; to provide the system whereby the major components such as compressor, condenser, evaporator, blowers and the like can be brought clear of the vehicle easily and quickly for full exposure to the serviceman; to provide the system with unobtrusive structure and design which does not disturb the esthetic appearance of the vehicle; and to provide the system with safety and ease of handling structure whereby one serviceman can easily move the system from underneath the vehicle and then back underneath after servicing.

SUMMARY OF THE INVENTION

The above and other objects hereinafter appearing have been attained in accordance with the present invention which may be summarized as comprising a device for supporting an A.C. (air conditioning) unit underneath the floor and at least partially up of a vehicle such as mobile or manufactured home or recreational vehicle, wherein the device and A.C. unit can be pivoted down to clear the unit from any obstructing beams or the like and then to allow the device and unit to be easily and quickly moved out from underneath the vehicle to a generally horizontal posture above the roadway for repair, replacement, or other servicing.

BRIEF DESCRIPTION OF THE DRAWINGS

The invention will be further understood from the following drawings and description, wherein.

DETAILED DESCRIPTION

Figure 1:
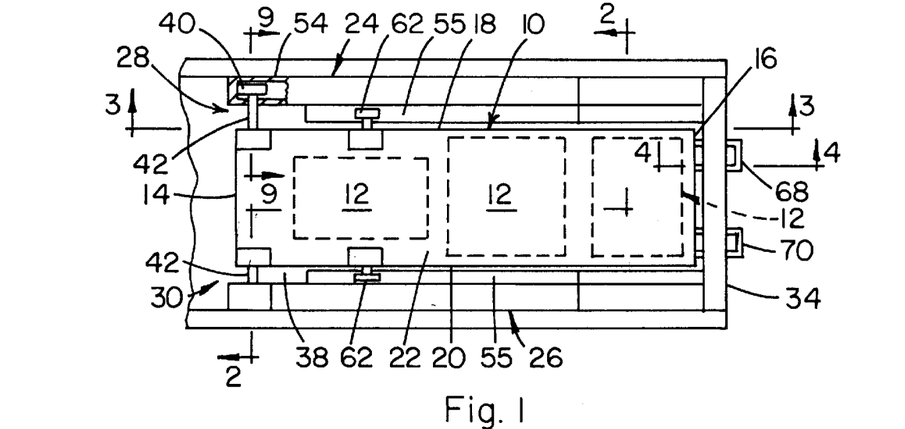
FIG. 1 is a view looking down thru a rear portion of a chassis of a recreational vehicle floor removed and showing the present device in one of its embodiments in its installed position with components of an air conditioning unit shown in typical location thereon in dotted outline.
Figure 2:
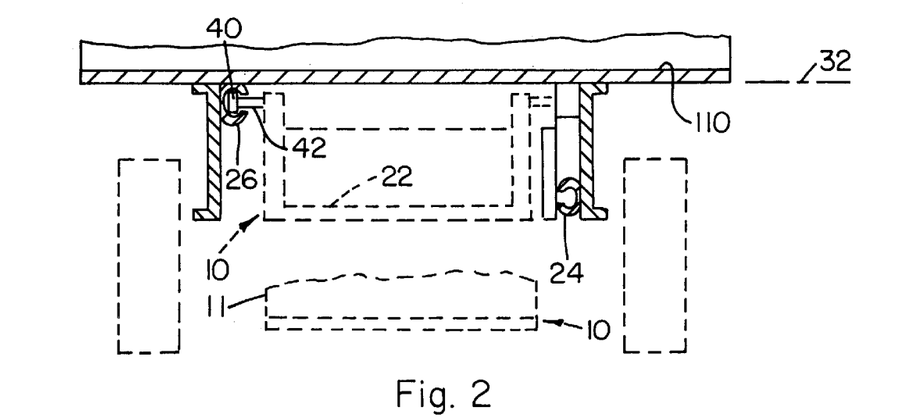
FIG. 2 is a cross-sectional view taken along line 2—2 of FIG. 1 in the direction of the arrows.
Figure 3:
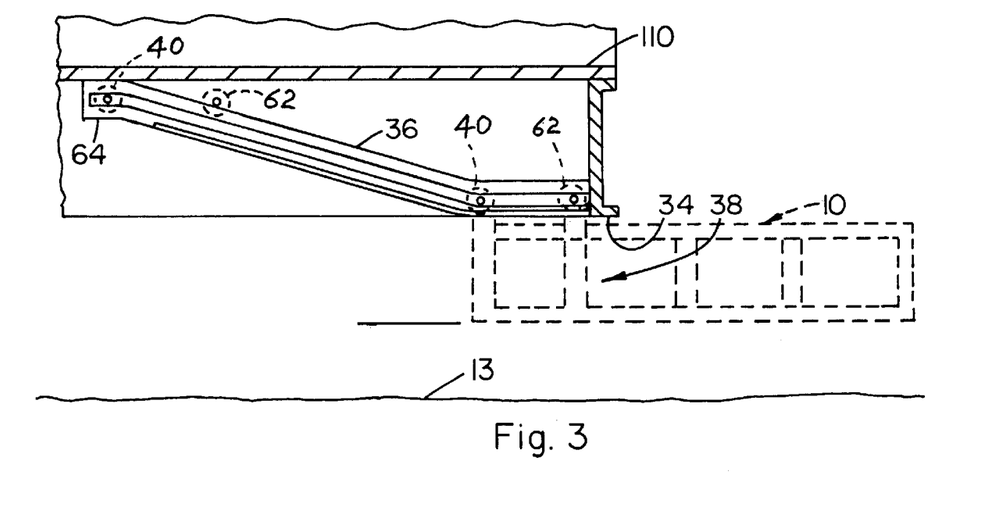
FIG. 3 is a cross-sectional view taken along line 3—3 of FIG. 1 in the direction of the arrows with rollers shown by dotted line in the installed and servicing positions of the device.
Figure 13:
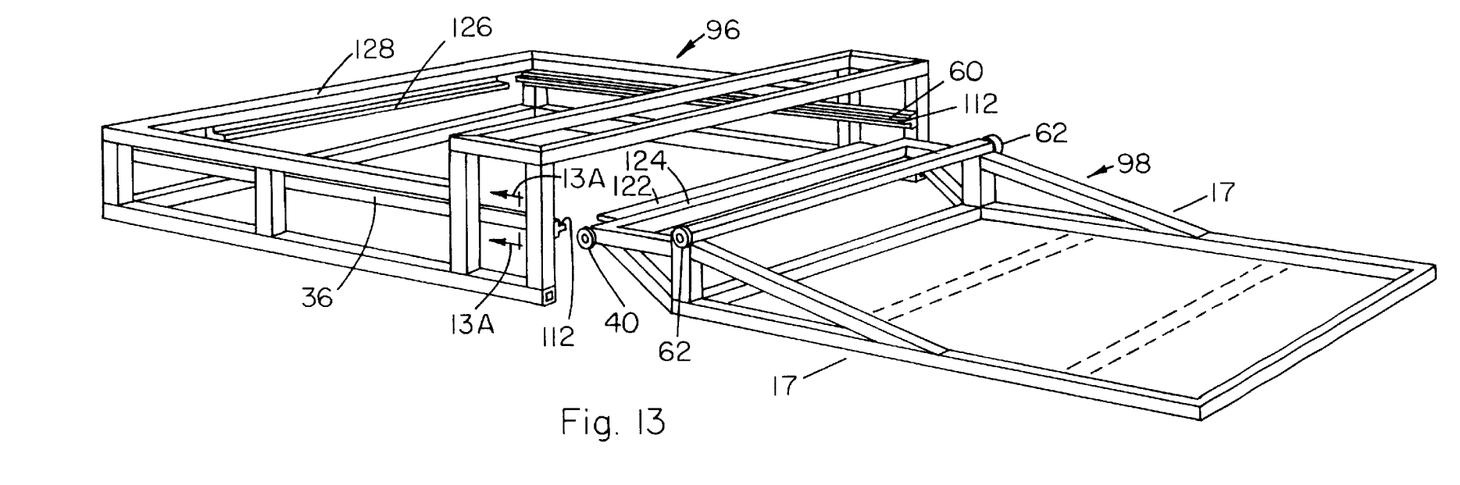
FIG. 13 is an isometric view of the carriage and supporting frame of FIG. 10.
Figure 13A:
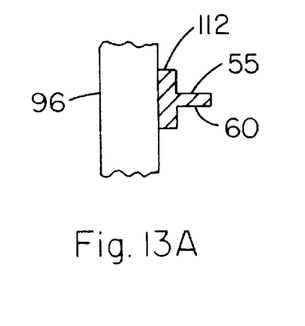
FIG. 13A is a cross-sectional view of rail 112 of FIG. 13 taken along line 13A—13A.

The invention will be further understood from the following description with reference to FIGS. 1–9, particularly with reference to claims hereof, wherein one preferred embodiment of the present device comprises carriage means 10 for supporting an air conditioning unit 12 shown in dotted outline with items labeled, the carriage means having a generally rectangular peripheral outline defined by front and rear portions, 14 and 16 respectively lying forward and aft of center line 17 of said carriage means, as shown in FIG. 13, and opposing side portions 18 and 20 affixed to and encompassing platform means 22 for supporting said unit, rail means 24 and 26 adapted to mount on said vehicle, cooperating elements of pivot means 28 and 30 on said front portion of said device adjacent said and on said rail means for providing a pivotal mounting of said carriage means on said vehicle whereby substantial portions of said carriage means and unit can be pivoted downwardly from a plane 32 of the vehicle floor to clear said rear portion and unit from a rear cross support beam or blocking structure 34 of the vehicle, each said rail means having a segment 36 which is substantially parallel to said floor plane, or which slants downwardly from said floor plane toward a rear access section 38 of the vehicle, i.e., the open bottom between the support beams, and the cooperating elements, i.e., guide roller 40 and axle 42 of each said pivot means being movable along said segment whereby substantial portions of said carriage means and unit can be easily pulled out from underneath said access section for convenient servicing at position 11 as shown in FIG. 2 above a roadway 13 or the like, e.g., about 10 inches.

Figure 7:
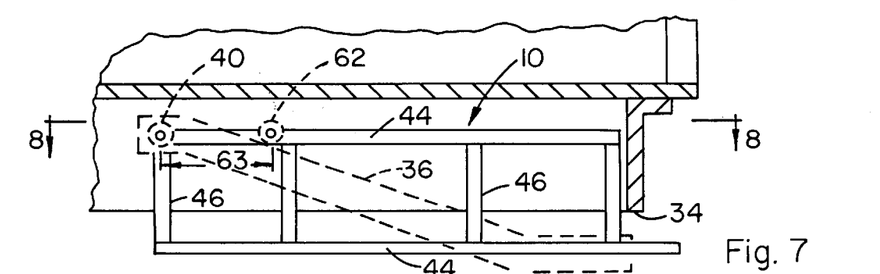
FIG. 7 is a view similar to FIG. 3 but showing a variation in the relative dimensions and placements of the rail means with the rail means and rollers shown in dotted outline.
Figure 8:
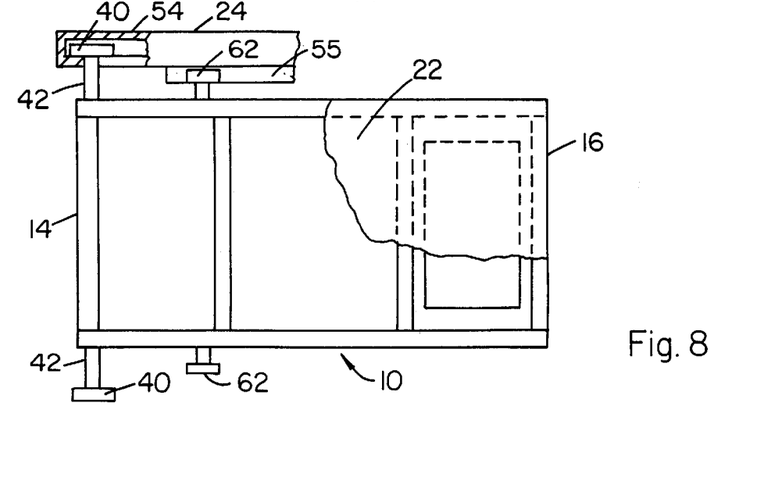
FIG. 8 is a top down view of the device and portions of the rail means broken away for clarity, taken along line 8—8 of FIG. 7 in the direction of the arrows.

The carriage means 10 is preferably a fabricated structure such as shown in FIGS. 7 and 8 wherein the horizontal pieces 44 and vertical pieces 46 are of angle iron or square tubular steel welded into a rigid framework. Platform 22 such as plywood or metal sheet may be provided as necessary over selected portions of the lower framework pieces to support components of the unit and to allow desired air flow to and around the various components of the unit.

The A.C unit which may include a heat pump can be of any shape, size and configuration as long as it can fit underneath the vehicle floor with sufficient vertical clearance from the roadway to allow the carriage and unit to be dropped down to clear the rear support beam or the like 34.

The A.C. ductwork of the unit and vehicle generally designated 50 are provided with mating seal flange means generally designated 52 (FIG. 16) which become disengaged when the carriage and unit are pivoted downwardly and moved rearwardly, and which becomes reengaged when the carriage and unit are moved forwardly to their installed position to thereby complete the required air flow conduits for providing conditioned air to the vehicle interior. Likewise, the necessary electrical connections for powering the compressor, fans and other components of the unit are preferably provided by a single plug and socket which can be readily disconnected if necessary to allow withdrawal of the carriage and unit to a servicing position.

Figure 9:
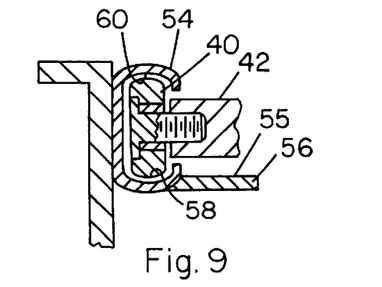
FIG. 9 is an enlarged cross-sectional view of a supporting frame portion, a guide or forward roller, and a rail means.
Figure 10:
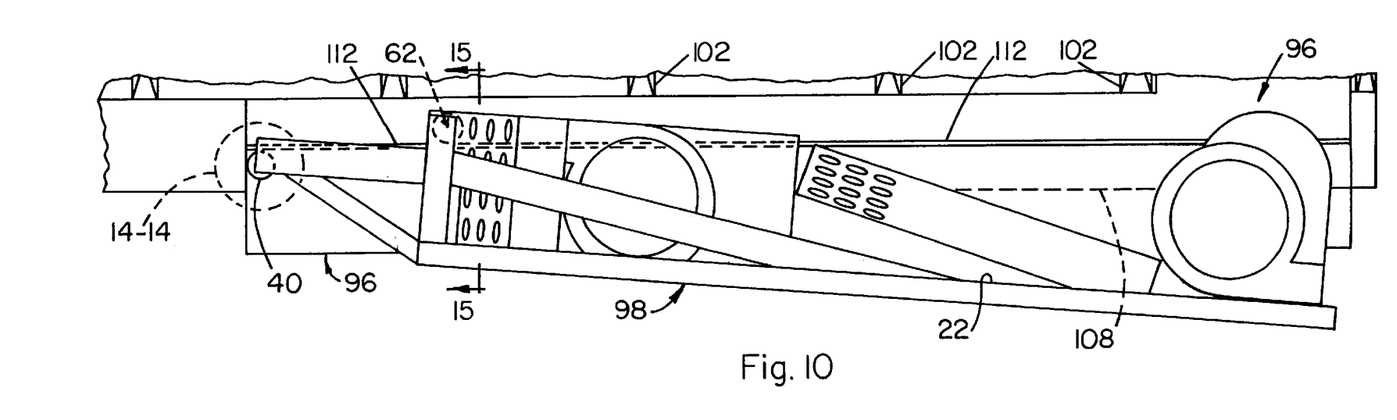
FIG. 10 is a side view of the carriage and a preferred embodiment of the supporting frame therefor, utilizing a substantially straight and horizontally postured rail means with the carriage pivoted down.
Figure 11:
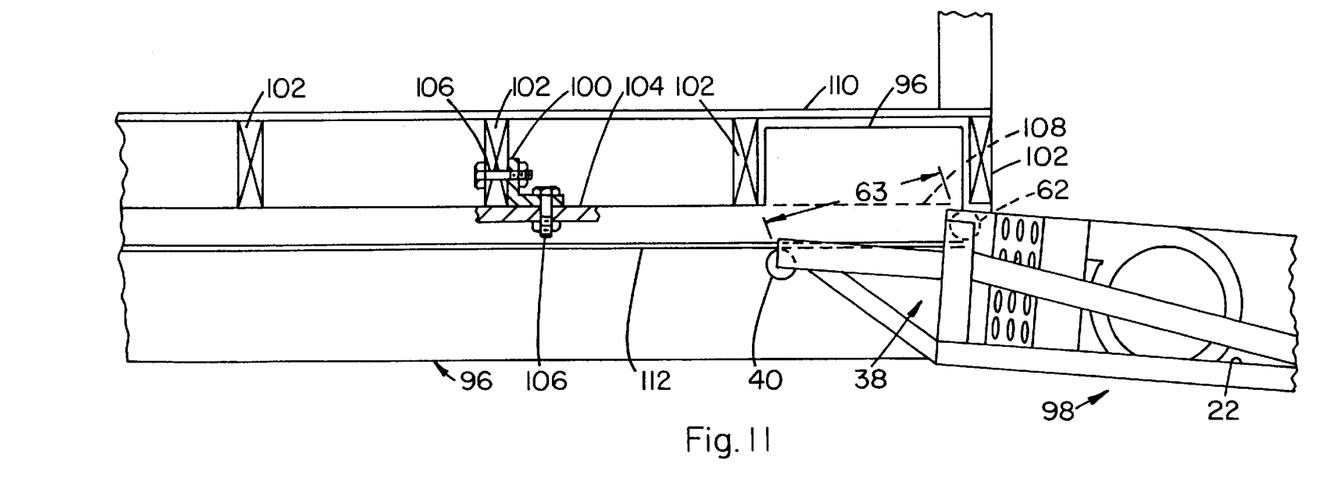
FIG. 11 is a view of the structure of FIG. 10 with the carriage withdrawn from under the vehicle to its servicing position.

In one preferred embodiment of FIGS. 8 and 9, each rail means generally designated 24 and 26 preferably comprises a first section of a pull-up type garage door roller guide of a slotted tubular construction 54 and a second substantially flat section 56. The guide or forward roller 40 in its forward installed position rides on the bottom surface 58 of the rail tube, and in its rearward servicing position rides on the upper surface or upward motion first stop structure 60 of the rail tube. This occurs since in the installed position a preferred fulcrum roller 62 structurally and functionally equivalent to roller 40 is lifted off of section 56 of the rail means, whereas in the intermediate dropped carriage position and the final servicing position, roller 62 bears heavily on the second stop structure 55 of section 56 and causes guide roller 40 to pivot upwardly with considerable force and generates moment arm means 63 which supports the overbalanced weight of the carriage means and A.C. unit.

It is noted that the required position, posture, configuration and dimensions of the rail means are readily determined by one skilled in the art as dictated by the dimensions, particularly vertical, of the components of the A.C. unit, the length of the carriage, the vertical dimension of blocking beams 34 of the like, and the clearance or the bottom surface of the carriage from the roadway. In this regard, as seen from FIG. 7, the rail means shown in dotted outline, if necessary, can be constructed to extend below the bottom edges of the support beams of the vehicle.

The rails 24, 26 which can be used in any of the embodiments shown herein and of straight or slanted configuration, are preferably shaped, in this embodiment, at their forward ends to provide a substantially horizontal portion 64 which takes some of the effort pressure off of both the initial downward pivoting of the carriage as well as the final reinsertion of the carriage to its installed position. The rails can be of any construction which allows the proper pivoting of the carriage to clear any obstruction and then to allow the carriage to assume an approximate horizontal posture both in its installed and servicing positions. For example, the first 54 and second 56 sections of the rails can be separately mounted on the vehicle frame or chassis, and the guide and fulcrum rollers do not have to be in the same plane of the carriage as is shown in the drawings.

Figure 4:
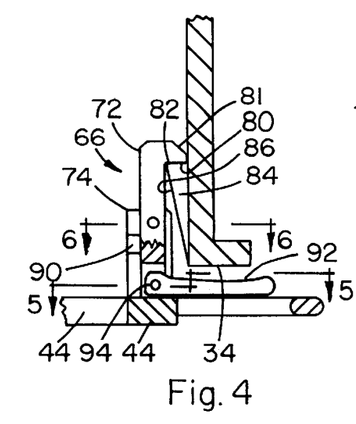
FIG. 4 is a cross-sectional view taken along line 4—4 of FIG. 1 in the direction of the arrows and showing a latching mechanism for the device.
Figure 5:
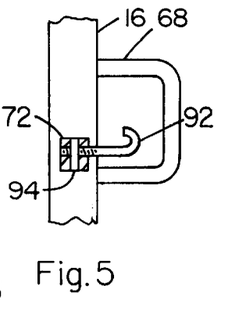
FIG. 5 is a cross-sectional view taken along line 5—5 of FIG. 4 in the direction of the arrows and showing a finger pull latch release.
Figure 6:
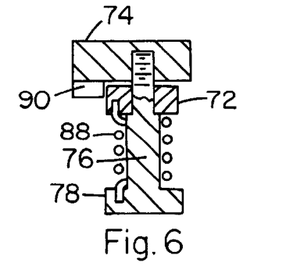
FIG. 6 is a cross-sectional view taken along line 6—6 of FIG. 4 in the direction of the arrows and showing a torsion spring mechanism for automatically engaging the latching mechanism.

It is preferred to provide an automatic up-position locking means generally designated 66 for the rear of the carriage as shown in FIGS. 4–6 such that an individual operator can grip handles 68, 70 and simply lift the rear end of the carriage until the locking means snaps into a locking position whereby the carriage is automatically retained in its installed position.

The locking means 66 can be any type but in one preferred embodiment of FIGS. 4–6 comprises a latch arm 72 pivotally mounted on a piece 74 of the carriage frame by shaft 76 which is affixed to piece 74 and to a head segment 78. Arm 72 is pivotal on 76 to a locking position shown in FIG. 4 wherein shoulder 80 on the bottom of a top segment 81 of the arm rides over the top of a ledge 82 provided by the top of a vertical cam wedge 84 having cam surface 86. The action occurs as the rear frame member of the carriage is lifted to engage 81 with cam surface 86 until the carriage rear is in its up position at which point a coiled torque spring 88 loosely mounted on shaft 76 and affixed at opposite ends to stationary head segment 78 and to the pivotal latch arm 72 in known manner, forcibly pivots arm 72 clockwise to its shown locking position. A stop 90 on piece 74 prevents overpivoting of arm 72 when the carriage is in its dropped down position. The latch arm 72 is unlatched by means of a finger pull 92 pivotally connected to arm 72 by pin 94 and made easily accessible to the servicemans finger for pivoting arm 72 counter clockwise as he simultaneously grips the handles and moves the carriage rear upwardly a small fraction of an inch to release the frictional engagement of the shoulder 80 and ledge 82.

Referring to the most preferred embodiment of the invention as shown in FIGS. 10–16, the device is comprised of two manufactured sections, i.e., a carriage supporting frame 96 and the carriage 98. Frame 96 is adapted for attachment to the underside of the building by any suitable means such as strategically located brackets 100 bolted to the floor joists 102 and to portions 104 of the frame 96 by bolts 106 or equivalent fastening means. The joists are supported on and affixed to longitudinally extending building support beams 108 adjacent each side of the building floor 110. The number, dimensions, orientations and strengths of the various pieces of frame 96 and carriage 98 are selected to accommodate the particular vehicle and A.C. unit involved.

Figure 12:
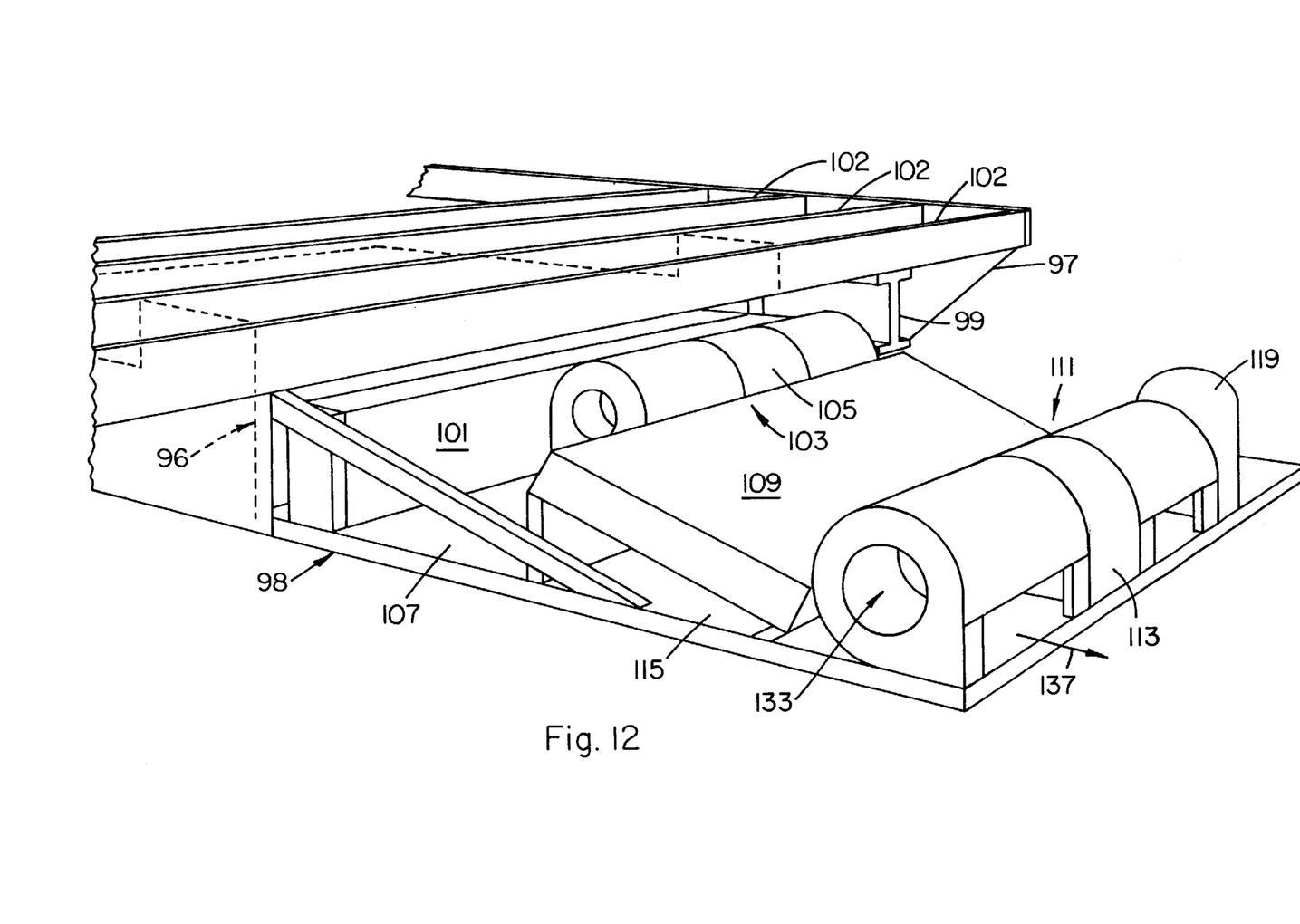
FIG. 12 is an isometric view of a typical arrangement of an A.C. unit mounted on the carriage of FIG. 10.

In FIGS. 12 and 18 the various components are shown schematically and comprises a wall support wing 97 and a longitudinal building support I beam 99 on each side of the floor construction, evaporator coil 101, dual evaporator fans 103 and drive motor 105, sheet metal floor means 107, condenser coil 109, dual condenser fans 111 having cool air inlets 133 and exhaust air outlets 137, and drive motor 113, open floor area 115 for condenser air flow, auxiliary electric heating unit 117, compressor 119, and accumulator 121, reversing valve 123, return air duct 127 from the building, and conditioned air supply duct 131 to the building. Other structures and air conditioner components may, of course, also be present.

Figure 15:
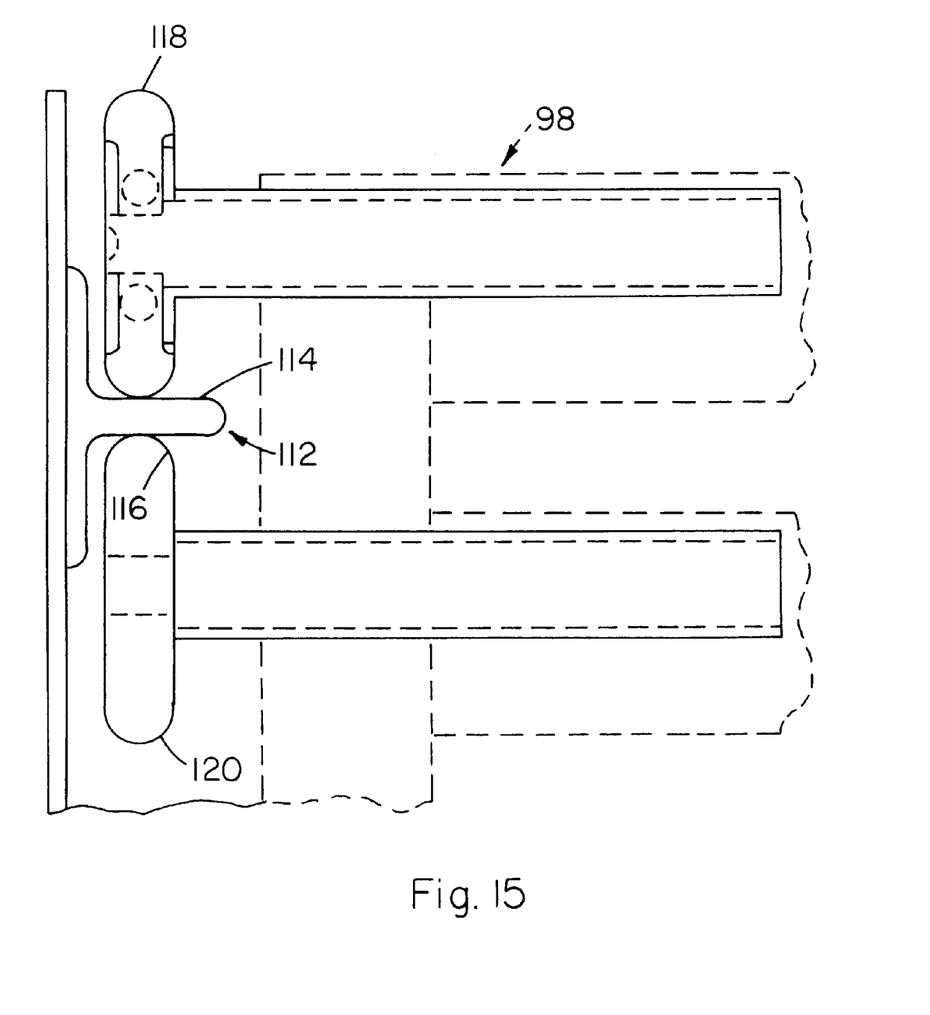
FIG. 15 is a cross-sectional view taken along line 15—15 of FIG. 10 in the direction of the arrows.

Referring to FIGS. 13 and 15, each rail means 112 of this embodiment comprises a substantially horizontally running member with an upper face 114 and lower face 116 upon which the ball bearing fulcrum roller 118 and the ball bearing guide roller 120 respectively run. In FIG. 15, the rollers are shown in the positions they occupy when the carriage is in its down pivoted position.

Figure 14:
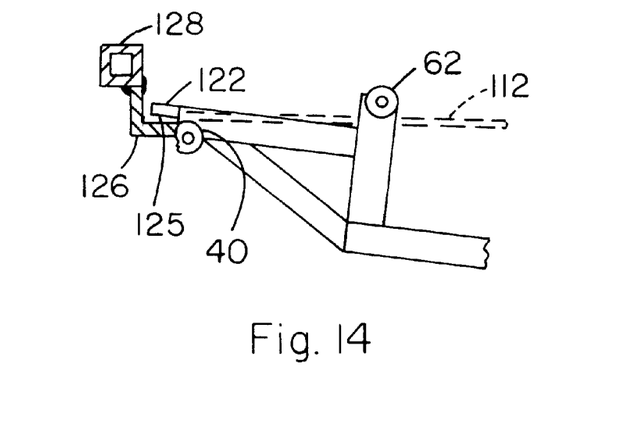
FIG. 14 is a partially cross-sectional view of a pivot means for the carriage of FIG. 10 taken of the dotted area designated 14—14 in FIG. 10.

Referring to FIG. 114, in order to provide a pivot means for the carriage which is the equivalent of the pivot means for the device of FIG. 1, a ledge means such as angle iron 122 is welded or otherwise affixed to member 124 of the carriage frame. A cooperating angle iron or the like shoulder member 126 is welded or otherwise affixed to an adjacent floor joist or member 128 of the supporting frame or any equivalent member on the vehicle chassis. In operation, with the carriage moved to its installed position wherein ledge means 122 has ridden up over the top of shoulder member 126, the rear 16 of the carnage is ready to be pivoted upwardly about the pivot provided by 126 and 122. To allow this pivoting to proceed, a sufficient gap 125 should be provided between 122 and 126 to prevent binding of roller 40 against face 116 of rail means 112 as the carriage is pivoted upwardly and thus allow 122 and 126 to make carnage supporting contact.

Figure 16:
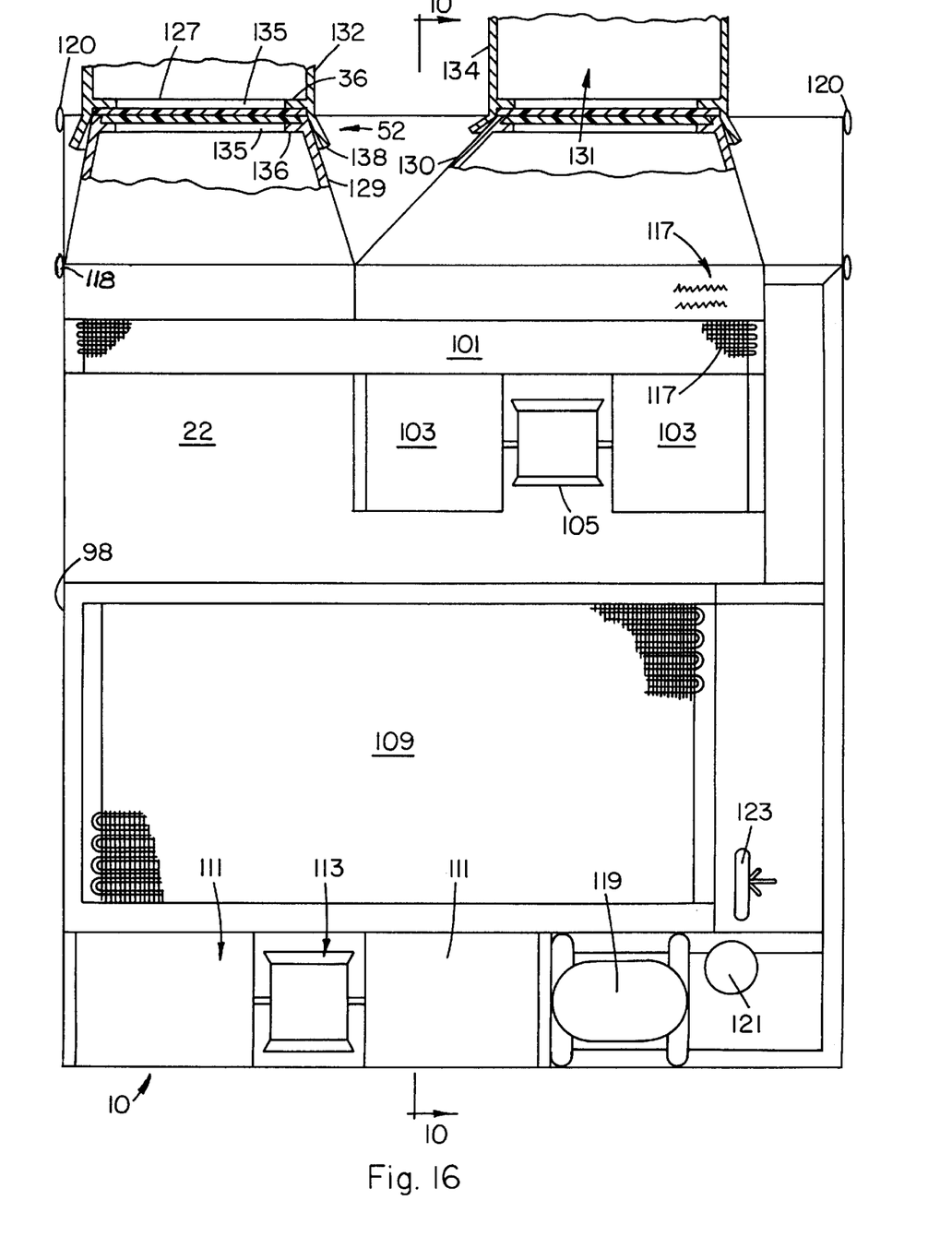
FIG. 16 is a top plan view of the device and A.C. unit of FIG. 10 in its installed position with portions of the mating air ductwork of the vehicle and unit broken away for clarity of description.

Referring to FIG. 16, the general positioning layout for the A.C. unit components on the carriage is shown along with a useful type of connecting structure for removably joining the air ductwork of the vehicle with the ductwork of the A.C. unit. This connecting structure which is exemplarly only, comprises feed-in sheet metal conduits 129, 130 affixed on the A.C. unit and/or carriage and receiving sheet metal conduits 132, 134 affixed on the vehicle. The openings 135 of the conduits are defined by inside flanges such as 136 to which elastomeric sealing rings surrounding the openings are affixed. Flared, funnel shaped flanges 138 surrounding the openings 135 assist in achieving an easy mating and sealing of the vehicle and A.C. unit conduits as the carriage is rolled inwardly to its installed position.

This invention have been described in detail with particular reference to preferred embodiments thereof, but it will be understood that variations and modifications will be effected within the spirit and scope of the invention.

What is claimed is:

1. The combination of a vehicle and a device for supporting A.C. means underneath a floor of said vehicle, which vehicle has overhead blocking structure on said vehicle which prevents direct movement of said A.C. means parallel to the plane of said floor out from underneath said vehicle, said device comprising carriage means for supporting said A.C. means and having a generally rectangular peripheral outline defined by a front portion, a rear portion and opposing side portions encompassing platform means for supporting said A.C. means, rail means on said vehicle underneath said floor and extending substantially to adjacent said blocking structure, cooperating elements of pivot means on said carriage means adjacent said front portion thereof and on said vehicle for providing a pivotal mounting of said carriage means on said vehicle whereby said carriage means and A.C. unit supported thereon can be pivoted downwardly relative to the plane of said floor to clear said rear portion of said carriage means and said unit from said blocking structure, forward roller means on said front portion of said carriage means and adapted to engage said rail means whereby substantial portions of said carriage means and unit can be pulled out from underneath said blocking means and floor fu an access section for convenient servicing and then pushed back into an installed position underneath said floor, and stop means on said carriage means and said vehicle for limiting downward pivoting of said carriage means.

2. The combination of claim 1 wherein cooperating retaining means are provided on said rear portion of said carriage means and on said vehicle adjacent said access section thereof whereby said rear portion can be lifted upwardly about said pivotal mounting and removably connected to said vehicle when said carriage means and unit are moved into said installed positioned underneath said vehicle floor.

3. The combination of claim 1 wherein said carriage means and vehicle are provided with cooperating fulcrum elements of fulcrum means positioned rearwardly of said forward roller means whereby engagement of said fulcrum elements will provide a fulcrum for the rearward weight of said carriage means and unit, and wherein all overhead stop means is provided on said vehicle for engaging said roller means and preventing said rearward weight from excessively downwardly pivoting said carriage means and unit about said fulcrum means.

4. The combination of claim 3 wherein one element of said fulcrum means is provided by shoulder means on an upper surface of said rail means.

5. The combination of claim 4 wherein the positions of said pivot means and said fulcrum means are both movable along said rail means as said carriage means is moved between an installed position and a servicing position.

6. The combination of claim 5 wherein said pivot means comprises roller means mounted on said carriage means and rollably contained between upper and lower stop means on said vehicle.

7. The combination of claim 6 wherein said fulcrum means comprises fulcrum roller means mounted on said carriage means and adapted to engage a stop surface on said rail means for preventing excessive downward pivoting of said carriage means.

8. The combination of a vehicle and a device for movably mounting at least the major components of an air conditioning unit underneath said vehicle, said vehicle having a substantially rectangular floor area, overhead blocking structure at the rear of said vehicle which prevents substantially direct horizontal movement of said unit out thru a rear access section of said vehicle, said device comprising carriage structure for supporting said unit and having a generally rectangular peripheral outline defined by a front portion, a rear portion and opposing side portions encompassing platform structure for supporting said unit, rail means mounted on said vehicle underneath said floor area and adjacent each side thereof and extending substantially the full length of said floor area generally toward the rear of said vehicle, cooperating elements of pivot means on said carriage structure adjacent said front portion and on each said rail means for providing a pivotal mounting of said carriage structure on said vehicle whereby substantial portions of said carriage means and unit can be pivoted downwardly from a plane of said floor to clear said rear portion and unit from said blocking structure, cooperating elements of said pivot means being movable in position along said segment whereby substantial portions of said carriage means and unit can be pulled out thru said access section for convenient servicing, and stop means on said vehicle for preventing excessive downward pivoting of said carriage means.

9. The combination of claim 1 wherein cooperating retaining means are provided on said rear portion of said carriage means and on said vehicle adjacent said access section thereof whereby said rear portion can be lifted upwardly about said pivotal mounting and removably connected to said vehicle when said carriage means and unit are moved to an installed position underneath said floor.

10. The combination of claim 1 wherein said carriage structure and vehicle are provided with cooperating fulcrum elements of fulcrum means positioned rearwardly of the pivot element on said carriage structure, whereby engagement of said fulcrum elements will provide a fulcrum for the rearward weight of said structure and unit, and wherein said pivot means is provided with stop means for preventing said rearward weight from pivoting said carriage means and unit about said fulcrum means.

11. The combination of claim 10 wherein one element of said fulcrum means is provided by upwardly facing shoulder means on said rail means.

12. The combination of claim 11 wherein said pivot means and said fulcrum means are both movable along said rail means as said carriage means is moved between an installed position and a servicing position.

13. The combination of claim 12 wherein said pivot means comprises roller means mounted on said carriage structure and rollably contained between upper and lower stop means on a guide trough of said rail means.

14. The combination of claim 8 wherein each pivot means comprises the elements of (1) forward roller means on each said side portion of said carriage structure adjacent the front portion thereof, and (2) a downwardly facing surface of each said rail means, and each said stop means comprises the elements of (1) a fulcrum roller means on each said side portion of said carriage structure rearwardly of said forward roller means, and (2) an upwardly facing surface of each said rail means.

15. The combination of a vehicle and a device for movably mounting at least the major components of an air conditioning unit underneath the vehicle floor for movement on said vehicle generally rearwardly thru an access section of said vehicle for servicing said unit exteriorly of the rear of said vehicle and then forwardly on said vehicle for reinstalling said unit to an operative position underneath said vehicle, which vehicle has overhead blocking structure which prevents direct movement of said unit generally parallel to said floor out from underneath the rear of said vehicle, said device comprising carriage structure for supporting said unit in a position whereby the combined weight of said carriage structure and unit is overbalanced rearwardly of a center of gravity of said carriage structure and unit, said carriage structure having a front portion lying forwardly of said center of gravity and a rear portion lying rearwardly of said center of gravity, rail structure on said vehicle underneath said floor, cooperating elements of pivot structure on said front portion of said carriage structure and on said vehicle for providing a pivotal mounting of said carriage structure on said vehicle whereby substantial portions of said carriage structure with said unit supported thereon can be pivoted downwardly to clear at least the rear portions of said carriage structure and unit from said blocking structure, said rail structure extending generally longitudinally underneath said vehicle generally toward the rear thereof, forward roller means on said front portion of said carriage structure for rolling on said rail structure, first stop structure on said vehicle for limiting upward motion of said forward roller means relative to said rail means, fulcrum roller means mounted on said front portion of said carriage structure rearwardly of said forward roller means and adapted to be brought downwardly into rolling engagement with said rail structure thru downward pivoting of said carriage structure, second stop structure on said vehicle for limiting downward motion of said fulcrum roller means relative to said rail structure whereby moment arm structure is generated on said forward portion of said carriage structure, said moment arm structure acting to support the overbalanced weight of said carriage structure and unit whereby substantial portions of said carriage structure and unit can be pulled out from underneath said vehicle thru said access section for convenient servicing and then pushed back into a forward position and pivoted upwardly and locked in an installed position on said vehicle.

16. The combination of claim 15 wherein cooperating retaining structures are provided on said rear portion of said carriage structure and on said vehicle adjacent the rear thereof whereby said carriage structure can be lifted upwardly about said pivotal mounting and removably connected in an up position to said vehicle when said carriage structure has been moved into said installed position underneath said vehicle floor.

17. The combination of claim 15 wherein said rail structure is formed to provide both of said first and second stop structures.

18. The combination of claim 15 wherein said cooperating elements of said pivot structure comprise (1) said forward roller means on said carriage structure and (2) said rail structure on said vehicle.

19. The combination of claim 15 wherein at least mid portions of said rail structure are slanted downwardly from front to rear.

20. The combination of claim 15 wherein said cooperating elements of said pivot structure comprises said forward roller means on said carriage structure and said rail structure on said vehicle, wherein said rail structure comprises a substantially straight, generally longitudinally oriented member mounted on said vehicle on each side of said carriage structure wherein a top surface of each said member provides a second stop structure, and wherein a bottom surface of each said member provides a first stop structure, wherein said forward roller means is adapted to engage said first stop structure, and wherein said fulcrum roller means is adapted to engage said second stop structure during operation of the device.

* * * * *